(12) United States Patent
Alfonso (10) Patent No.: US 11,086,146 B1
(45) Date of Patent: Aug. 10, 2021

(54) ANTI-FOG AND ANTI-IMPACT RIM CLIP FOR EYE GLASSES

(71) Applicant: Jessica Renee Alfonso, Palm Harbor, FL (US)

(72) Inventor: Jessica Renee Alfonso, Palm Harbor, FL (US)

( * ) Notice: Subject to any disclaimer, the term of this patent is extended or adjusted under 35 U.S.C. 154(b) by 0 days.

(21) Appl. No.: 17/225,091

(22) Filed: Apr. 7, 2021

(51) Int. Cl.
*G02C 11/08* (2006.01)

(52) U.S. Cl.
CPC ..................... *G02C 11/08* (2013.01)

(58) Field of Classification Search
CPC .............. G02C 11/08; G02C 11/00
USPC ...................................... 351/41, 62
See application file for complete search history.

(56) References Cited

U.S. PATENT DOCUMENTS

| | | | |
|---|---|---|---|
| 4,747,681 A | 5/1988 | Brower | |
| 5,412,438 A | 5/1995 | Bolle' | |
| 5,478,824 A | 12/1995 | Burns et al. | |
| 5,764,333 A | 6/1998 | Somsel | |
| 6,450,639 B1 * | 9/2002 | Abraham | A61F 9/026 2/435 |
| 6,692,124 B2 * | 2/2004 | Katz | A61F 9/028 2/435 |
| 7,036,929 B1 | 5/2006 | Harvey | |
| 7,434,929 B2 | 10/2008 | Jackson | |
| 7,604,866 B2 | 10/2009 | Ohashi et al. | |
| 7,951,866 B2 | 5/2011 | Nakabayashi | |
| 8,440,317 B2 | 5/2013 | Tsukane et al. | |
| 8,702,230 B2 | 4/2014 | Yi et al. | |
| 10,254,569 B2 | 4/2019 | Wilson | |
| 2006/0238698 A1 | 10/2006 | Sheldon | |
| 2010/0033672 A1 * | 2/2010 | Li | G02C 7/10 351/44 |
| 2014/0168598 A1 | 6/2014 | Spitzer | |
| 2017/0059885 A1 | 3/2017 | Patel | |
| 2019/0283349 A1 | 9/2019 | Oya et al. | |

* cited by examiner

*Primary Examiner* — Tuyen Tra
(74) *Attorney, Agent, or Firm* — Mark C. Johnson; Johnson Dalal (57) ABSTRACT

An anti-fog and anti-impact rim clip for eye glasses comprising a flexible, unitary, and handheld body with a front end, a rear end, a first retention clip member defining a first clip opening flanked by two opposing first clip ends and defining a first clip retention channel spatially coupled to the first clip opening, a second retention clip member defining a second clip opening flanked by two opposing second clip ends and defining a second clip retention channel spatially coupled to the first clip opening, and a body ledge protruding outwardly from the first and second retention clip members, defining the rear end of the body, having a sealing edge, and having an upper support surface interposed between the sealing edge and the first and second retention clip members, the body operably configured to be selectively placed in a flexed configuration with the body forming an arcuate shape.

18 Claims, 7 Drawing Sheets

ANTI-FOG AND ANTI-IMPACT RIM CLIP FOR EYE GLASSES

FIELD OF THE INVENTION

The present invention relates generally to attachments for eye glasses and, more particularly, relates to selectively couplable rim clips for eye glasses that are designed to reduce the likelihood of fogging of the eye glasses and damage to the rim of eye glasses upon impacting a surface.

BACKGROUND OF THE INVENTION

Various forms of attachments or accessories for eye glasses exist in the marketplace, each of which is intended to serve a specific function or address a specific need. While many such attachments and accessories permeate the marketplace, few are tailored toward reducing occurrences of fogging of the eye glasses when users are wearing face coverings and of reducing the likelihood of damage to the eye glasses when the same are not in use. In the wake of the novel coronavirus COVID-19 pandemic, the market has become saturated with various forms and types of personal protective equipment, commonly referred to as PPE, with the most popular items being face masks and shields that are generally worn by individuals over their mouth, nose, and/or face to prevent infection. These PPE products can often be restrictive and impractical or difficult to wear for a sustained period of time, particularly for users who wear prescription-strength eye glasses contemporaneously with their PPE products. The close proximity and restricted air flow between a user's eye glasses and their face mask or shield creates a continuous fogging of the eye glasses that substantially interferes with a user's visibility and overall comfort while wearing eye glasses with the face mask or shield. Existing prior art fails to address this relatively novel, though widespread, issue and instead reflects eye glass attachments or accessories designed to prevent the interference of sweat, rain, and other fluids or debris with a user's visibility. See, e.g., Jackson, U.S. Pat. No. 7,434,929 (Oct. 14, 2008); Spitzer, U.S. Patent Publication No. 2014/0168598 (Jun. 19, 2014). Additional limitations include failing to provide any type of feature that beneficially protects against damage or injury to the eye glasses upon impact.

Therefore, a need exists to overcome the problems with the prior art as discussed above.

SUMMARY OF THE INVENTION

The invention provides an anti-fog and anti-impact rim clip for eye glasses that overcomes the hereinafore-mentioned disadvantages of the heretofore-known devices and methods of this general type and that enables users to wear their PPE products, namely, face masks and shields, contemporaneously with their prescription-strength or non-prescription-strength eye glasses without having their visibility impaired by periodic and continuous fogging of the eye glasses caused by the user's intake and outtake of breath within the restricted space created by the face mask or shield. When the eye glasses are not in use, the present invention beneficially protects the eye glasses from substantial damage or injury upon impact, e.g., if the eye glasses are accidentally dropped, and keeps the eye glasses in an upright position until they are ready to be used again.

With the foregoing and other objects in view, there is provided, in accordance with the invention, a flexible, unitary, and handheld body with a first end, with a second end opposing the first end, with a body length separating the first and second ends, with a front end, with a rear end opposing the front end, with a first retention clip member disposed at the first end and the front end of the body, defining a first clip opening flanked by two opposing first clip ends, and defining a first clip retention channel spatially coupled to the first clip opening, with a second retention clip member disposed at the second end and the front end of the body, defining a second clip opening flanked by two opposing second clip ends, and defining a second clip retention channel spatially coupled to the first clip opening, and with a body ledge protruding outwardly from the first and second retention clip members, defining the rear end of the body, having a sealing edge spanning the body length, and having an upper support surface interposed between the sealing edge and the first and second retention clip members, the body operably configured to be selectively placed in a flexed configuration with the body forming an arcuate shape.

In accordance with another feature, an embodiment of the present invention includes the body defining a retention channel spanning from the first end of the body to the second end of the body and including the first clip retention channel and the second clip retention channel.

In accordance with a further feature of the present invention, the retention channel spans from the first end of the body to the second end of the body and includes the first clip retention channel and the second clip retention channel.

In accordance with a further feature of the present invention, the first retention clip member is spatially separated from the second retention clip member along the body length.

In accordance with a further feature of the present invention, the first retention clip member and the second retention clip member form a single unitary retention clip member disposed along the body length.

Although the invention is illustrated and described herein as embodied in an anti-fog and anti-impact rim clip for eye glasses, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. Also, for purposes of description herein, the terms "upper", "lower", "left," "rear," "right," "front," "vertical," "horizontal," and derivatives thereof relate to the invention as oriented in the figures and is not to be construed as limiting any feature to be a particular orientation, as said orientation may be changed based on the user's perspective of the device. Furthermore, there is no intention to be bound by any expressed or implied theory presented in the preceding technical field, background, brief summary or the following detailed description.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the flexible unitary body, from one side to another side of the body.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

Figure 1:
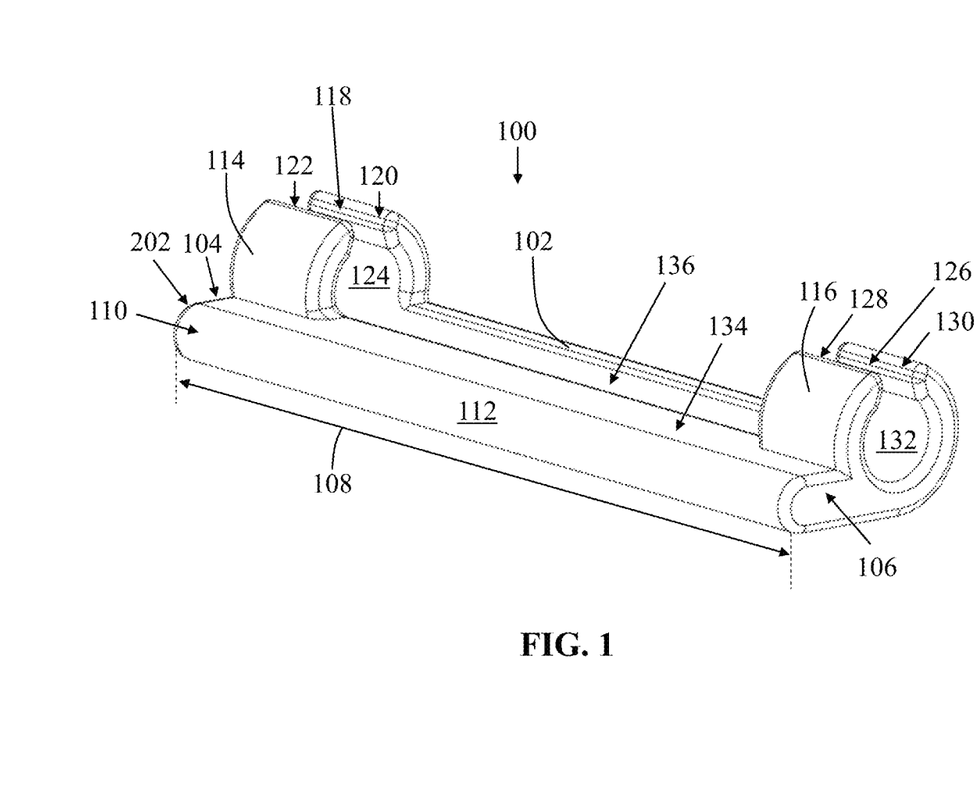
FIG. 1 is a perspective side view of the rear end of an anti-fog and anti-impact rim clip for eye glasses, in accordance with the present invention.

The present invention provides novel and selectively couplable rim clips for eye glasses that are designed to reduce the likelihood of fogging of the eye glasses and damage to the rim of eye glasses upon impacting a surface. Referring now to FIG. 1, one embodiment of the present invention is shown in a perspective side view of the rear end of an anti-fog and anti-impact rim clip for eye glasses 100 (hereinafter referred to simply as "rim clip" for brevity), in accordance with the present invention.

FIG. 1 shows several advantageous features of the present invention, but, as will be described below, the invention can be provided in several shapes, sizes, combinations of features and components, and varying numbers and functions of the components. The first example of a rim clip 100, as shown in FIG. 1, includes a flexible, unitary, and handheld body 102. As used herein, "flexible" refers to the ability of bending easily without breaking. In consideration of the various sizes, shapes, and forms that eye glasses and, more specifically, eye glass rims, can typically embody, the flexible quality or characteristic of the body 102 allows the orientation of the body 102 to be selectively manipulated to snugly fit around the bottom rim of an eye glass. This beneficial feature allows the rim clips to be used on a wide variety of eye glasses, both prescription-strength and non-prescription-strength, without concerns that the rim clips cannot accommodate the shape, form, or size of any particular pair of eye glasses. In an exemplary embodiment, the body 102 is substantially comprised of a polysiloxane composition, generally known as silicone, or another substantially equivalent material to beneficially retain flexibility of movement of the body 102. Said another way, the body 102 material may be of an elastically deformable material that allows conformance with an exterior surface shape.

As further used herein, "unitary" refers to the ability to move or flex together as a unit, e.g., one or more component(s) are formed together through casting, injection molding, adhering to components together, welding, or other means of manufacture. As used herein, "handheld" refers to being designed to be held in a user's hand. The unitary and handheld features of the body 102 provide several advantageous and beneficial qualities to the present invention including, without limitation, providing a relatively compact and portable unit that makes it easier and more convenient for users to carry, store, and move the rim clips at their convenience. When in use and attached to the rims of a pair of eye glasses, the dimensions and size of the body 102 are designed to minimally interfere with a user's visibility through the eye glasses as well as to not significantly weigh the eye glasses down on a user's face. In a preferred embodiment, the body 102 defines a body length 108 between approximately 0.5 inches and 2.0 inches and the body 102 weighs no greater than 0.5 ounces. The body 102 is operably configured to be selectively placed in a flexed configuration with the body 102 forming an arcuate shape, wherein "arcuate" means curved or bow-shaped and "selectively" is defined herein as requiring some external force thereon, e.g., by the user and on each end of the body 102.

Figure 2:
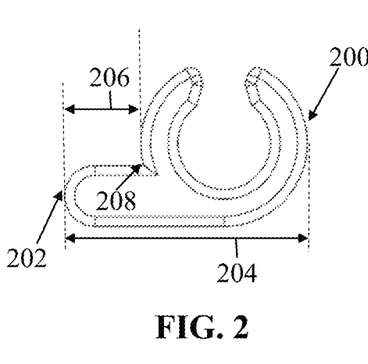
FIG. 2 is an elevational side view of an anti-fog and anti-impact rim clip for eye glasses, in accordance with the present invention.

It should be understood that terms such as, "front," "rear," "side," top," "bottom," and the like are indicated from the reference point of a viewer viewing the body 102 from a front end 200 (see FIG. 2). As used herein, the term "eye glasses" is intended broadly to encompass vision eyewear consisting of glass or hard plastic lenses mounted in a frame that holds them in front of a person's eyes, typically utilizing a bridge over the nose and hinged arms which rest over the ears. Eye glasses may serve a medical or corrective function, e.g., prescription glasses which temporarily improve a user's sight, or a non-medical function, e.g., sunglasses or decorative glasses.

Figure 6:
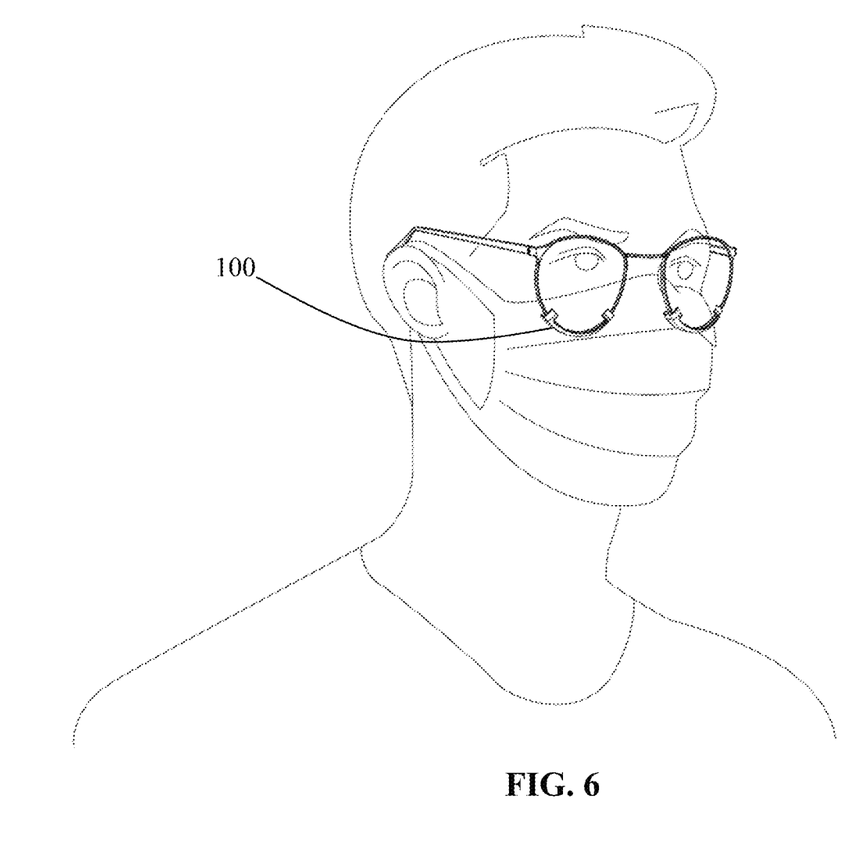
FIG. 6 is a perspective front view of an anti-fog and anti-impact rim clip for eye glasses attached to a pair of eye glasses and in use, in accordance with an exemplary embodiment of the present invention.

As seen in FIGS. 1 and 2, the body 102 has a first end 104, a second end 106 opposing the first end 104, the body length 108 separating the first and second ends 104, 106, a front end 200, and a rear end 202 opposing the front end 200. The body 102 further has a first retention clip member 114 disposed at the first end 104 and the front end 200 of the body 102, wherein the first retention clip member 114 define a first clip opening 118 flanked by two opposing first clip ends 120, 122, and define a first clip retention channel 124 spatially coupled to the first clip opening 118. In one embodiment, the first and second ends 104, 106 of the flexible, unitary, and handheld body 102 are disposed as the respective terminal end thereof, while in other embodiments they are disposed in close proximity thereto, i.e., 10% of the body length 108. As seen in FIG. 6, when in use the front end 200 faces away from the user whereas the rear end 202 faces towards the user's face and, when used properly, is in direct contact with the user's face.

Figure 3:
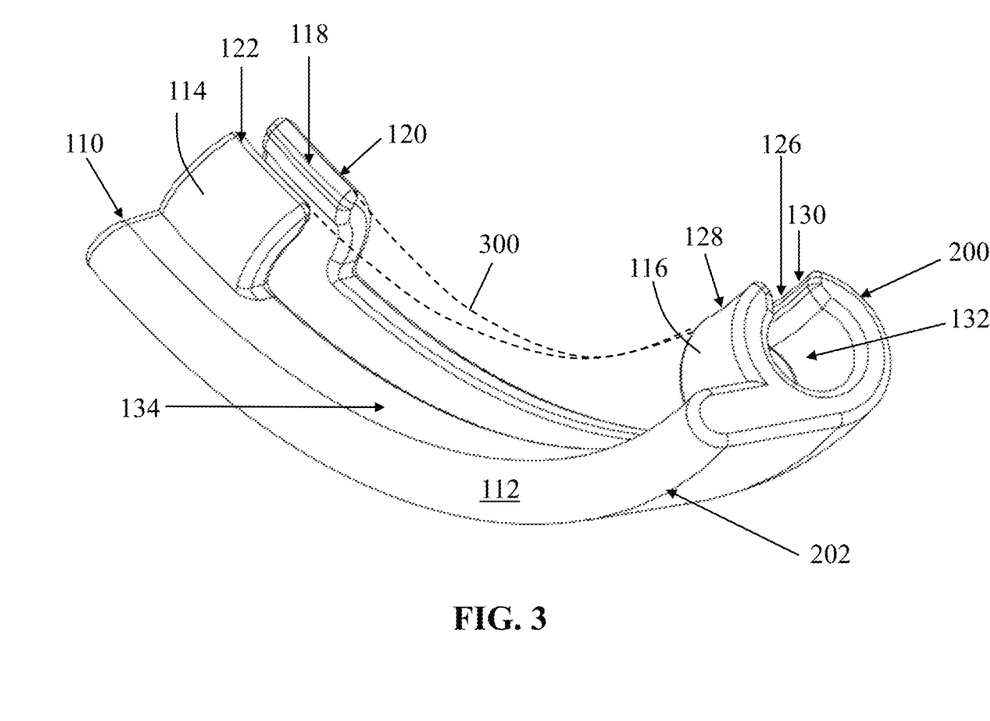
FIG. 3 is a perspective side view of the rear end of an anti-fog and anti-impact rim clip for eye glasses.

As best depicted in FIGS. 1 and 3, the body 102 has a second retention clip member 116 disposed at the second end 106 and the front end 200 of the body 102, the second retention clip member 116 defining a second clip opening 126 flanked by two opposing second clip ends 128, 130, and defining a second clip retention channel 132 spatially coupled to the first clip opening 126. The first clip retention channel 124 and the second clip retention channel 132 are designed to receive the bottom eye glass rim that is then kept physically in place by the first retention clip member 114 and the second retention clip member 116. More specifically, the two opposing first clip ends 120, 122 and the two opposing second clip ends 128, 130 are operably configured to clamp around the bottom eye glass rim when the bottom eye glass rim is placed within the first clip retention channel 124 and the second clip retention channel 132, assisting to maintain a snug and secure fit around the bottom eye glass rim and to prevent the eye glasses from accidentally or inadvertently falling or slipping out from in between the two opposing first clip ends 120, 122 and the two opposing second clip ends 128, 130.

Although in a preferred embodiment, the two opposing first clip ends 120, 122 and the two opposing second clip ends 128, 130 are operably configured to selectively clamp around the bottom rim of eye glasses, the specific means of selectively attaching to the bottom rim may vary. In a preferred embodiment, the first retention clip member 114 and the second retention clip member 116 are cantilevered, wherein "cantilevered" is defined as fixed or supported at only one end so as reduce the surface area, on each eye glass, that is obstructed by the first retention clip member 114 and the second retention clip member 116 and to increase a user's visibility through the eye glasses.

In an alternate embodiment, the first retention clip member 114 and the second retention clip member 116 are spatially apart from one another, as seen in FIGS. 1 through 6, which serves to reduce the surface area, on each eye glass, that is obstructed by the first retention clip member 114 and the second retention clip member 116 and to increase a user's visibility through the eye glasses. In yet another embodiment, the first retention clip member 114 and the second retention clip member 116 may be defined by a single, unitary piece of material without any space between the first retention clip member 114 and the second retention clip member 116. In this latter embodiment, the single, unitary piece of material may provide a more secure or snug fit between the first and second retention clip members 114, 116 and the eye glasses for added security in preventing the rim clip 100 from inadvertently detaching or separating from the eye glasses. In one embodiment, the two opposing first clip ends 120, 122 and the two opposing second clip ends 128, 130 each or solely having a friction-inducing surface thereon (e.g., surfaces shown in FIG. 1), thereby operably configured to cause frictional compression with opposing sides of a lens of the eye glasses. The friction-inducing surface may be of a natural rubber material and may be of the same material forming the body 102. In additional embodiments, the friction-inducing surface may be created from a coating applied to one or more of the ends 120, 122, 128, 130.

As further depicted in FIG. 1, the body 102 has a body ledge 110 protruding outwardly from the first and second retention clip members 114, 116, defining the rear end 202 of the body 102, having a sealing edge 112 spanning the body length 108, and having an upper support surface 134 interposed between the sealing edge 112 and the first and second retention clip members 114, 116. The beneficial function of the protruding body ledge 110 and, more specifically, the sealing edge 112 is to gently push a user's face mask or shield against the user's face in such a way that the face mask or shield is flush with the user's face, eliminating substantially all channels or pockets of air that may escape from the inside of the face mask or shield into the user's general eye area. Said differently, the sealing edge 112 seals the upper edge of the face mask or shield against the user's upper cheek area so that no intake or outtake of breath can escape from the upper edge of the face mask or shield into the user's general eye area thereby fogging the user's eye glasses. The body ledge 110 reduces the likelihood of fogging of the eye glasses because the sealed upper edge of the face mask or shield substantially prevents the escape of air therefrom, re-directing the air within the face mask or shield to another side or edge of the face mask or shield to escape.

The width of the upper support surface 134 may vary or fluctuate in alternate embodiments to facilitate a tighter or looser seal between the upper edge of the face mask or shield and the user's upper cheek area, e.g., a wider upper support surface 134 would create a substantially tighter seal between the upper edge of the face mask or shield and the user's upper cheek area thereby further reducing the likelihood of fogging of the eye glasses. In one embodiment, the sealing edge 112 uniformly (i.e., of the same width from the clip members 114, 116) spans the body length 108 in a linear orientation (as best shown in FIGS. 1-3). In one embodiment, the body 102 defines a body width 204 separating the front and rear ends 200, 202 of the body 102 and a ledge width 110 separating the sealing edge 112 and the joint 208 from which the body ledge 110 protrudes outwardly from the first and second retention clip members 114, 116, wherein the ledge width 206 is at least 25% of the body width 204. This proportional width enables the body 102 to form a good seal with the user's face or mask while coupled to the eye glasses.

In an exemplary embodiment, the body 102 further defines a retention channel 136 spanning from the first end 104 of the body 102 to the second end 106 of the body 102 and including the first clip retention channel 124 and the second clip retention channel 132. To facilitate a snugger or tighter fit between the rim clip 100 and the eye glasses, the body 102 may also comprise the retention channel 136 operably configured to receive the bottom rim of the eye glasses and potentially a portion of the eye glasses. When the eye glasses are at rest with the rim clip 100 thereon, the retention channel 132 is operably configured to evenly distribute the weight of the eye glasses to retain the eye glasses in an upright position and to thereby maintain user visibility of the eye glasses and reduce the likelihood that the eye glasses may be inadvertently damaged or broken such as, by way of example and without limitation, where a heavy or bulky item is accidentally placed on top of the eye glasses.

In an alternate embodiment, the retention channel 136 spans from the first end 104 of the body 102 to the second end 106 of the body 102 and includes the first clip retention channel 124 and the second clip retention channel 132. By spanning continuously from the first end 104 of the body 102 to the second end 106 of the body 102, the retention channel 136 may retain a longer or larger portion of the bottom rim of the eye glasses so as to facilitate a substantially corresponding fit between the bottom rim of the eye glasses and the retention channel 136.

In an exemplary embodiment, the first retention clip member 114 is spatially separated from the second retention clip member 116 along the body length 108 to beneficially reduce the surface area, on each eye glass, that is obstructed by the first retention clip member 114 and the second retention clip member 116 and to increase a user's visibility through the eye glasses. In alternate embodiments, the first retention clip member 114 and the second retention clip member 116 form a single unitary retention clip member disposed along the body length 108 (as represented with dashed lines 300). In the latter embodiment, the surface area that is obstructed by the first retention clip member 114 and the second retention clip member 116 may be slightly greater but the single unitary retention clip member facilitates a more secure fit between the rim clip 100 and the eye glasses that may not be as susceptible to inadvertent or accidental detachment as having the first and second retention clip members 114, 116.

Figure 4:
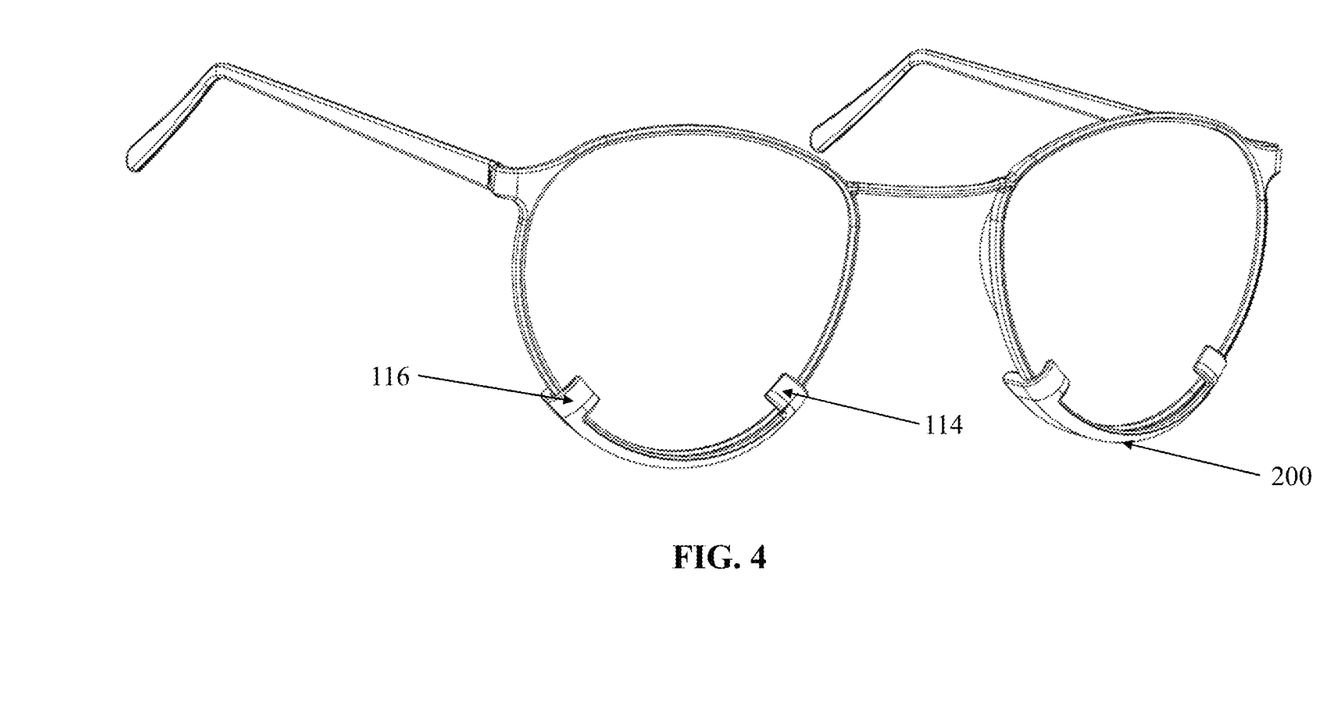
FIG. 4 is a perspective front view of an anti-fog and anti-impact rim clip for eye glasses attached to a pair of eye glasses, in accordance with the present invention.
Figure 5:
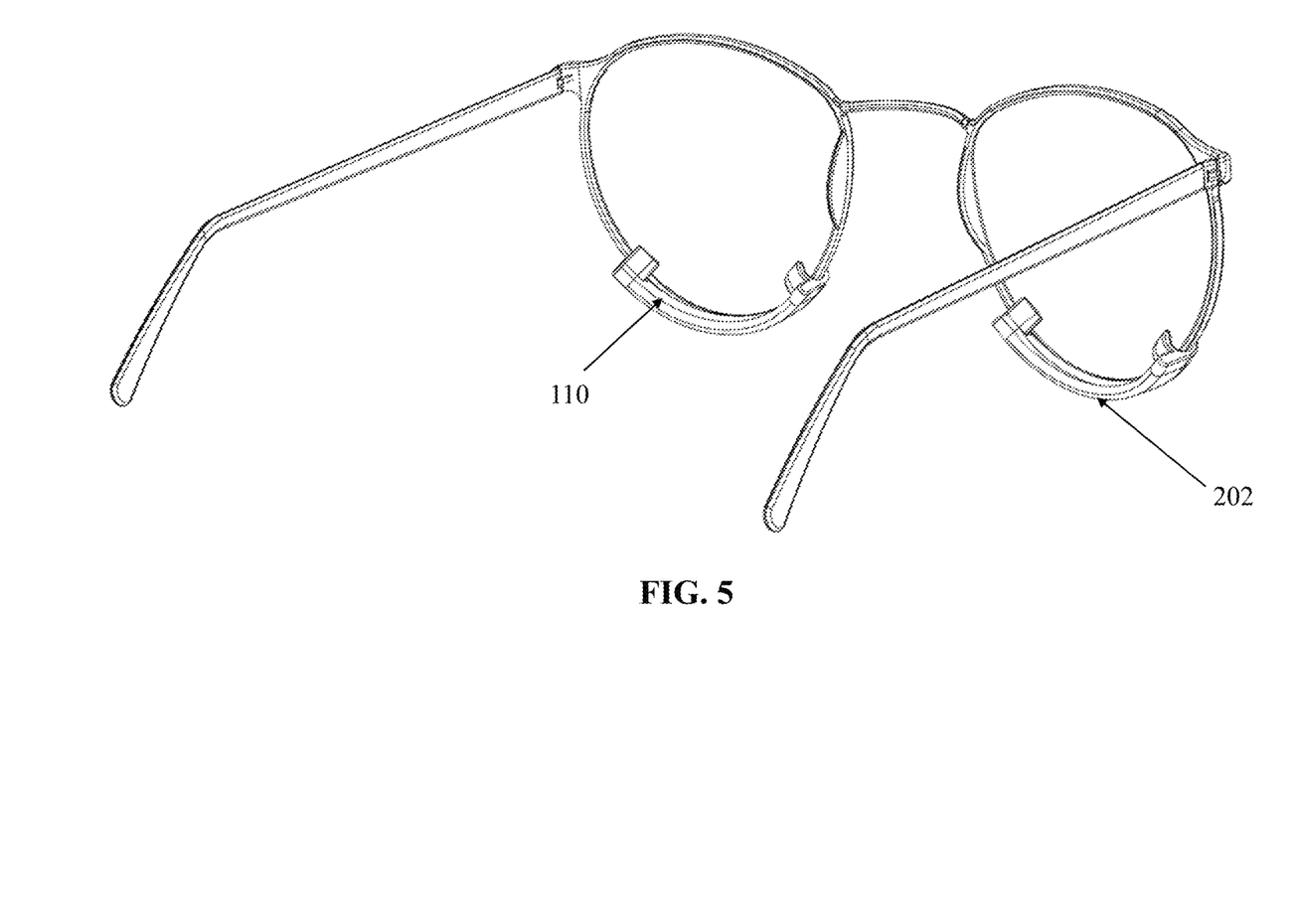
FIG. 5 is a perspective rear view of an anti-fog and anti-impact rim clip for eye glasses attached to a pair of eye glasses, in accordance with the present invention.

FIG. 4 depicts a perspective front view of the rim clip 100 selectively attached to a pair of eye glasses. FIG. 5 depicts a perspective rear view of the rim clip 100 selectively attached to a pair of eye glasses. In FIG. 6, the rim clip 100 is portrayed as it generally would be when in use and on a pair of eye glasses.

Figures 7, 8:
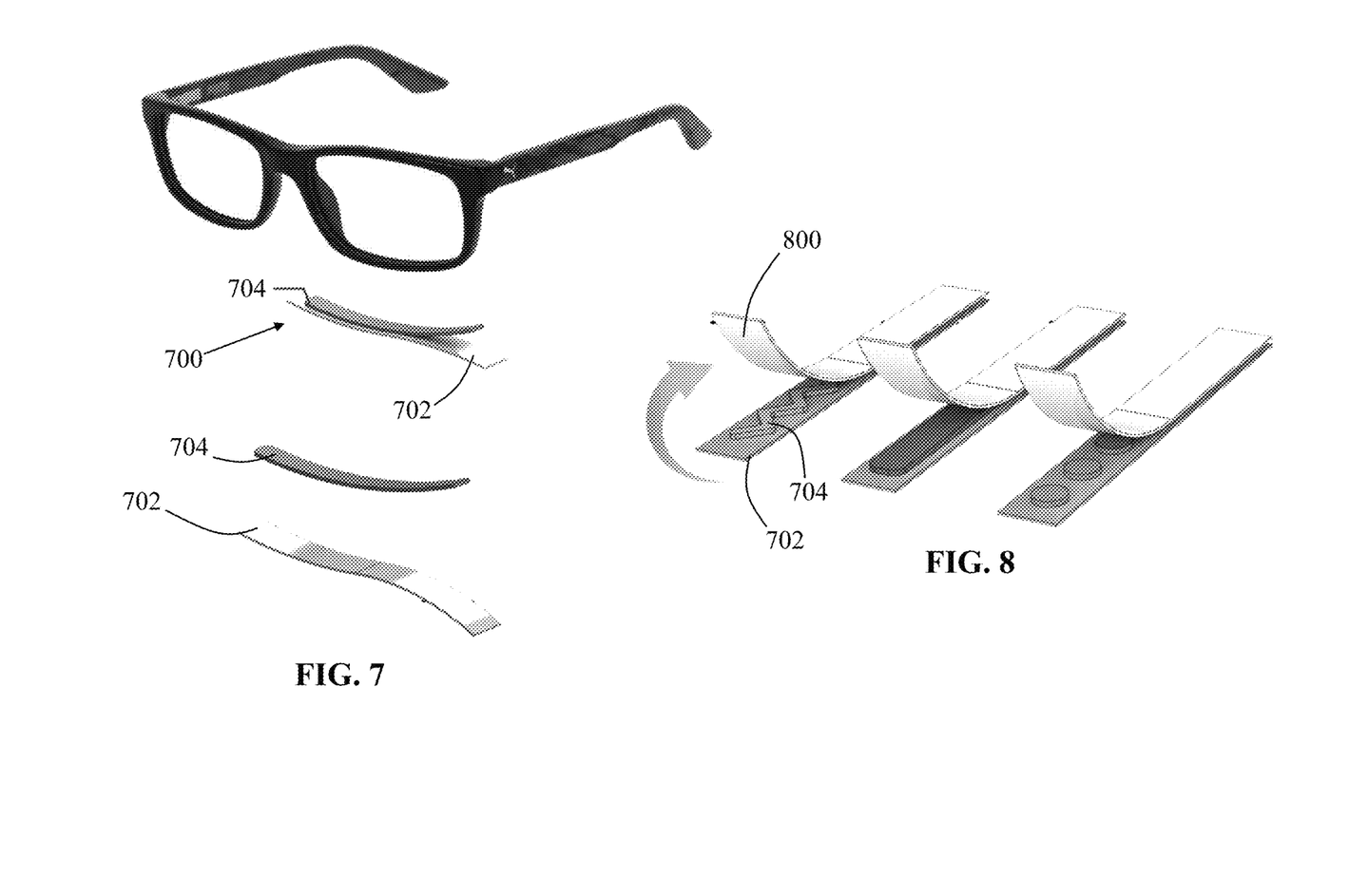
FIG. 7 is an exploded view of an anti-fog and anti-impact rim strip in accordance with one embodiment of the present invention.
FIG. 8 is a perspective view various anti-fog and anti-impact rim strips in accordance with embodiments of the present invention.

With reference to FIGS. 7-8, views of an anti-fog and anti-impact rim strip 700 is depicted and may include a polymeric cover layer 800 that is selectively removable from a base layer 702 having an adhesive or other binding material 704 disposed thereon. The cover layer 800 may be removable in the direction depicted by the arrow in FIG. 8. The adhesive 704 may be disposed in various advantageous configurations depicted in FIG. 8. The base layer 702 is preferably of an elastically deformable and flexible material, e.g., natural rubber, that protects the rim of the glasses from scratching or other damage when placed on a ground surface. The base layer 702 may also include perforations formed thereon that facilitate in the user forming a strip 700 of a desired size to conform to the bottom rim portion of a pair of glasses.

Figure 9:
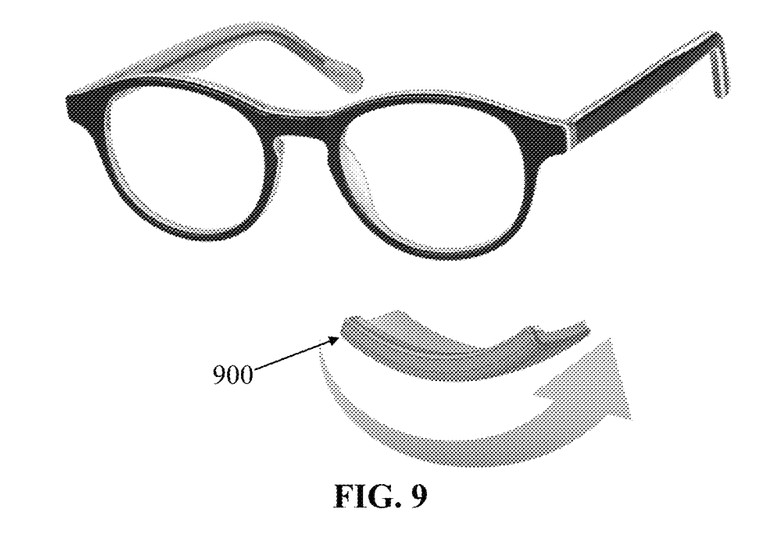
FIG. 9 is an exploded view of an anti-fog and anti-impact rim clip in accordance with one embodiment of the present invention.
Figure 10:
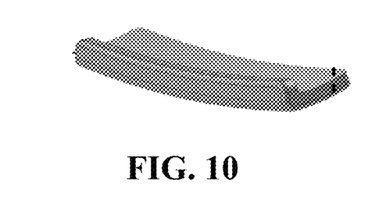
FIG. 10 is a perspective view of the anti-fog and anti-impact rim clip in FIG. 9.
Figure 11:
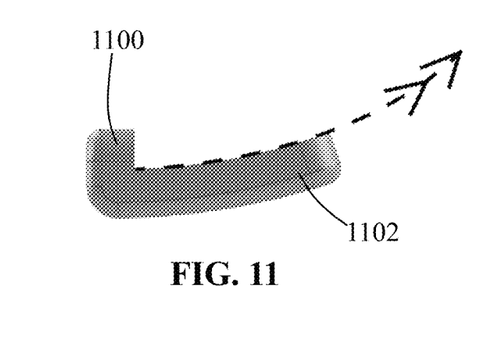
FIG. 11 is an elevational side view of the anti-fog and anti-impact rim clip in FIG. 9.

With reference to FIGS. 9-11, views of an anti-fog and anti-impact rim clip 900, similar in material and configuration to the clip described above and depicted in FIGS. 1-6. However, the clip 900 shown in FIGS. 9-11 adheres to the bottom rim of the glasses using adhesive and may also utilize a protective cover strip. When desired for use, the clip 900 will be flexed to the desired configuration and/or shape (e.g., arcuate shape) and may also be sized by the user (by cutting the clip 900). Then, the user will place the clip 900 to the bottom surface of the rims of the glasses. In another embodiment, the ledge 1100 of the clip 900 may include a flange that facilitates coupling the clip 900 to the rim of the glasses. The base portion 1102 of the clip 900 may be preferably curved to create a good seal while wearing a face mask and may also be sized to extend passed the rearward edge of the rim that is coupled thereto to form a good seal with the face of a user.

Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the above described features.

What is claimed is:

1. An anti-fog and anti-impact rim clip for eye glasses comprising:
    a flexible, unitary, and handheld body with a first end, with a second end opposing the first end, with a body length separating the first and second ends, with a front end, with a rear end opposing the front end, with a first retention clip member disposed at the first end and the front end of the body, defining a first clip opening flanked by two opposing first clip ends, and defining a first clip retention channel spatially coupled to the first clip opening, with a second retention clip member disposed at the second end and the front end of the body, defining a second clip opening flanked by two opposing second clip ends, and defining a second clip retention channel spatially coupled to the first clip opening, and with a body ledge protruding outwardly from the first and second retention clip members, defining the rear end of the body, having a sealing edge spanning the body length, and having an upper support surface interposed between the sealing edge and the first and second retention clip members, the body operably configured to be selectively placed in a flexed configuration with the body forming an arcuate shape.

2. The anti-fog and anti-impact rim clip for eye glasses according to claim 1, wherein:
    the body defines a retention channel spanning from the first end of the body to the second end of the body and including the first clip retention channel and the second clip retention channel.

3. The anti-fog and anti-impact rim clip for eye glasses according to claim 2, wherein:

the retention channel is spanning from the first end of the body to the second end of the body and including the first clip retention channel and the second clip retention channel.

4. The anti-fog and anti-impact rim clip for eye glasses according to claim 1, wherein:
the first retention clip member is spatially separated from the second retention clip member along the body length.

5. The anti-fog and anti-impact rim clip for eye glasses according to claim 1, wherein:
the first retention clip member and the second retention clip member form a single unitary retention clip member disposed along the body length.

6. The anti-fog and anti-impact rim clip for eye glasses according to claim 1, wherein the two opposing first clip ends and the two opposing second clip ends each further comprise:
a friction-inducing surface thereon, thereby operably configured to cause frictional compression with opposing sides of a lens of the eye glasses.

7. The anti-fog and anti-impact rim clip for eye glasses according to claim 1, wherein:
the first and second ends of the flexible, unitary, and handheld body are disposed as the respective terminal end thereof.

8. The anti-fog and anti-impact rim clip for eye glasses according to claim 1, wherein:
the sealing edge uniformly spans the body length in a linear orientation.

9. The anti-fog and anti-impact rim clip for eye glasses according to claim 1, further comprising:
a body width separating the front and rear ends of the body and a ledge width separating the sealing edge and the joint from which the body ledge protrudes outwardly from the first and second retention clip members, the ledge width at least 25% of the body width.

10. An anti-fog and anti-impact rim clip for eye glasses comprising:
a flexible and handheld body with a first end, with a second end opposing the first end, with a body length separating the first and second ends, with a front end, with a rear end opposing the front end, with a first retention clip member disposed along the body length, defining a first clip opening flanked by two opposing first clip ends, and defining a first clip retention channel spatially coupled to the first clip opening, with a second retention clip member disposed along the body length, defining a second clip opening flanked by two opposing second clip ends, and defining a second clip retention channel spatially coupled to the first clip opening, defining a retention channel spanning from the first end of the body to the second end of the body and including the first clip retention channel and the second clip retention channel, and with a body ledge protruding outwardly from the first and second retention clip members, defining the rear end of the body, having a sealing edge spanning the body length, and having an upper support surface interposed between the sealing edge and the first and second retention clip members, the body operably configured to be selectively placed in a flexed configuration with the body forming an arcuate shape.

11. The anti-fog and anti-impact rim clip for eye glasses according to claim 1, wherein:
the body is unitary.

12. The anti-fog and anti-impact rim clip for eye glasses according to claim 1, wherein:
the first retention clip member is disposed at the first end and the second retention clip member disposed at the second end.

13. The anti-fog and anti-impact rim clip for eye glasses according to claim 10, wherein:
the retention channel is spanning from the first end of the body to the second end of the body and including the first clip retention channel and the second clip retention channel.

14. The anti-fog and anti-impact rim clip for eye glasses according to claim 10, wherein:
the first retention clip member is spatially separated from the second retention clip member along the body length.

15. The anti-fog and anti-impact rim clip for eye glasses according to claim 10, wherein:
the first retention clip member and the second retention clip member form a single unitary retention clip member disposed along the body length.

16. The anti-fog and anti-impact rim clip for eye glasses according to claim 10, wherein the two opposing first clip ends and the two opposing second clip ends each further comprise:
a friction-inducing surface thereon, thereby operably configured to cause frictional compression with opposing sides of a lens of the eye glasses.

17. The anti-fog and anti-impact rim clip for eye glasses according to claim 10, wherein:
the first and second ends of the flexible, unitary, and handheld body are disposed as the respective terminal end thereof.

18. The anti-fog and anti-impact rim clip for eye glasses according to claim 10, wherein:
the sealing edge uniformly spans the body length in a linear orientation.

* * * * *